US010550973B2

(12) United States Patent
Caston et al.

(10) Patent No.: US 10,550,973 B2
(45) Date of Patent: Feb. 4, 2020

(54) SEPARATION-RESISTANT PIPE JOINT

(71) Applicant: UNITED STATES PIPE AND FOUNDRY COMPANY, LLC, Birmingham, AL (US)

(72) Inventors: Jay Derek Caston, Trussville, AL (US); William W Holmes, IV, Maylene, AL (US); Russell J Huggins, McCalla, AL (US)

(73) Assignee: United States Pipe and Foundry Co., LLC, Birmingham, AL (US)

( * ) Notice: Subject to any disclaimer, the term of this patent is extended or adjusted under 35 U.S.C. 154(b) by 482 days.

(21) Appl. No.: 15/103,718

(22) PCT Filed: Dec. 11, 2014

(86) PCT No.: PCT/US2014/069810
§ 371 (c)(1),
(2) Date: Jun. 10, 2016

(87) PCT Pub. No.: WO2015/089313
PCT Pub. Date: Jun. 18, 2015

(65) Prior Publication Data
US 2016/0298797 A1 Oct. 13, 2016

Related U.S. Application Data
(60) Provisional application No. 62/065,411, filed on Oct. 17, 2014, provisional application No. 61/915,368, (Continued)

(51) Int. Cl.
*F16L 21/08* (2006.01)
*F16L 21/03* (2006.01)
(52) U.S. Cl.
CPC .............. *F16L 21/08* (2013.01); *F16L 21/03* (2013.01)

(58) Field of Classification Search
CPC ......... F16L 21/03; F16L 21/08; F16L 37/113; F16L 17/02
(Continued)

(56) References Cited

U.S. PATENT DOCUMENTS 3,684,320 A 8/1972 Platzer et al.
3,751,078 A 8/1973 O'Brian et al.
(Continued)

FOREIGN PATENT DOCUMENTS

JP 4542366 9/2010
WO 14052521 4/2014

OTHER PUBLICATIONS

Albaker, Fahad, M. "Examination Report—GCC application No. 2014-28523" dated May 31, 2018; pp. 1-6.
(Continued)

*Primary Examiner* — Zachary T Dragicevich
(74) *Attorney, Agent, or Firm* — Nicholas J. Landau; Bradley Arant Boult Cummings LLP

(57) ABSTRACT

A joint having a male joint member and female joint member, in which a raised stop on the male joint member is limited to displacement between a constriction on the female joint member and a locking ring segment, and in which the locking ring segment and constriction are separated by an unobstructed traverse region that allows the male joint member to slide axially when under stress without separation from the female joint member. The rounded shape of the groove that accommodates the locking ring segment acts like a universal joint, allowing deflection between the male and female joint members without separation. The female joint member flares on the inside of its distal region to accommodate such deflection. Thus the male and female joint members have a degree of axial and radial flexibility.

26 Claims, 11 Drawing Sheets

Related U.S. Application Data filed on Dec. 12, 2013, provisional application No. 61/915,341, filed on Dec. 12, 2013.

(58) Field of Classification Search
USPC .......................................... 285/305, 339, 374
See application file for complete search history.

(56) References Cited

U.S. PATENT DOCUMENTS

| | | | |
|---|---|---|---|
| 4,097,074 A | | 6/1978 | Nagao et al. |
| 4,296,953 A | | 10/1981 | Nagao et al. |
| 4,456,288 A | * | 6/1984 | Conner ................... F16L 21/08 285/374 X |
| 4,540,204 A | | 9/1985 | Battle et al. |
| 4,606,559 A | | 8/1986 | Rammelsberg |
| 4,685,708 A | | 8/1987 | Conner et al. |
| 4,871,197 A | | 10/1989 | Codding, III et al. |
| 5,393,107 A | * | 2/1995 | Vobeck ...................... 285/374 X |
| 5,476,290 A | | 12/1995 | Bergmann et al. |
| 5,607,190 A | | 3/1997 | Exandier et al. |
| 5,613,714 A | * | 3/1997 | Toshima ................. F16L 21/08 285/374 X |
| 6,062,611 A | | 5/2000 | Percebois et al. |
| 6,502,867 B2 | | 1/2003 | Holmes, IV et al. |
| 7,137,653 B2 | | 11/2006 | Copeland |
| 7,806,445 B2 | | 10/2010 | Mutschlechner et al. |
| 8,573,654 B2 | | 11/2013 | Kishi et al. |
| 2006/0119100 A1 | * | 6/2006 | Jones ............................ 285/374 |
| 2009/0152866 A1 | * | 6/2009 | Mutschlechner ....... F16L 21/03 |
| 2010/0140922 A1 | | 6/2010 | Siemens |
| 2015/0204469 A1 | * | 7/2015 | Arnold .................... F16L 21/08 285/305 |

OTHER PUBLICATIONS

Han, Inho "International Search Report and Written Opinion—International Application No. PCT/US2014/069810" Korean Intellectual Property Office; dated Apr. 24, 2015; pp. 1-29.

International Organization for Standardization "International Standard Earthquake- and subsidence-resistant design of ductile iron pipelines" First edition Feb. 1, 2006; pp. 1-40.

U.S. Pipe "TR Flex and HP Lok Telescoping Sleeves BRO-053 for Industrial Applications, Water & Wastewater brochure" 2011 Edition; pp. 1-12.

U.S. Pipe "TR Flex Restrained Joint Ductile Iron Pipe and Fittings for Fire Protection, Water & Wastewater brochure" 2012 Edition; pp. 1-46.

U.S. Pipe "TR Flex Restrained Joint Ductile Iron Pipe and Fittings for Fire Protection, Water & Wastewater brochure" 2013 Edition; pp. 1-46.

U.S. Pipe "TR Flex Restrained Joint Ductile Iron Pipe and Fittings for Fire Protection, Water & Wastewater" 2014 Edition; pp. 1-46.

* cited by examiner

SEPARATION-RESISTANT PIPE JOINT

CROSS-REFERENCE TO RELATED APPLICATIONS

This application is a national stage under 35 U.S.C. 371 of International Application PCT/US2014/069810, filed on Dec. 11, 2014 (currently pending). International Application PCT/US2014/069810 cites the priority of U.S. Provisional Patent Application No. 62/065,411, filed Oct. 17, 2014, and the priority of U.S. Provisional Patent Application No. 61/915,341, filed on Dec. 12, 2013, and also cites the priority of U.S. Provisional Patent Application No. 61/915,368, filed on Dec. 12, 2013. International Application PCT/US2014/069810 is incorporated by reference in its entirety.

BACKGROUND

A. Field of the Disclosure

The present disclosure relates generally to pipe fittings.

B. Background

Earth movement that occurs during floods, landslides, mudslides, seismic events, and other natural and man-made disasters applies forces to conduits that cause them to fail. Products may tolerate these forces via a number of methods, including inherent material flexibility or joint flexibility. When the conduit material is relatively inflexible, as is the case with iron or steel pipe, forces may be reduced to an acceptable level by adding joint deflection and/or displacement.

Several approaches have been taken to resist failure due to soil movement of pipes and other conduits. One approach has been to provide a restrained joint (as opposed to a flexible one), but such restrained joints cannot resist extremely high axial or radial forces, as they are designed to prevent axial displacement and deflection instead of allowing such movement without failure. One attempted solution was the placement of a crushable element between a fixed weld and a locking ring segment so that the crushable element could absorb excessive forces to prevent disengagement; however, when the crushable element fails under excessive forces, in some cases the remnants of the crushable element can damage components of the joint, such as gaskets. Other designs have involved locking rings placed around a pipe spigot internal to a pipe socket, which are complicated to install, and even more difficult to disassemble and service after installation.

Consequently there is a long-felt need in the art for a pipe joint that resists separation under extreme stresses that can be easily installed and disassembled.

SUMMARY

A separation-resistant pipe joint is provided. A general embodiment of the joint comprises a female joint member, said female joint member comprising: (a) an inner surface; (b) a circumferential groove on the inner surface to accommodate a locking ring segment, said circumferential groove having a shape consisting essentially of a frustum of an ellipsoid defined by two generally parallel planes each intersecting the ellipsoid such that the center of the ellipsoid is not between the two generally parallel planes; (c) a constriction on the inner surface proximal to the circumferential groove, the constriction having a constriction diameter; (d) an unobstructed traverse region between the groove and the constriction having a regional diameter that is greater than the constriction diameter; and (e) an unobstructed reverse taper region proximal to the constriction, having a second regional diameter that is greater than or equal to the constriction diameter and which increases in the proximal direction. In this general embodiment, the male and female joint members may be axially displaced relative to one another without separation under stress (this property is referred to in some places as "axial flexibility"). The shape of the circumferential groove allows deflection of the male pipe joint member while permitting simple installation and servicing. The traverse region allows axial displacement of the joint members relative to one another, and the reverse taper region allows the male joint member to deflect while inserted into the female joint member without contacting the inner surface of the female joint member on the proximal end. Furthermore, the male and female joint members may be deflected without separation under stress, due to the shape of a circumferential groove that accommodates a locking ring segment and a reverse taper region toward the proximal portion of the female joint member.

Another general embodiment of the joint comprises a female joint member comprising: (a) means to restrain a weld bead on a pipe spigot from removal due to excessive extension; (b) means to retain the restraining means and to permit said restraining means to deflect in any direction; (c) means to restrain the weld bead from excessive insertion; (d) an unobstructed traverse region between element (a) and element (c) having an axial length sufficient to allow at least 2″ (5 cm) of axial displacement of the weld bead; and (e) an unobstructed reverse taper region proximal to element (c), having a second regional diameter greater than the diameter of the spigot that increases in the proximal direction.

A method of assembling a separation-resistant pipe joint is provided, in which the pipe joint comprises the female pipe joint member as provided above and a male pipe joint member. In a general embodiment of the method, the male pipe joint member comprises a raised stop on its outer surface having a stop diameter; the female pipe joint member comprises a notch that widens the mouth of the female joint member over an arc of less than 180°; and the method comprises: (a) inserting the male joint member into the female joint member to an extent that the raised stop passes the groove; (b) inserting a locking ring segment into the notch, the locking ring segment having a shape complementary to the shape of the groove, and the locking ring segment defining a circumferential arc that is smaller than the arc of the notch; and (c) sliding the locking ring segment into the groove so that most of the locking ring segment is no longer in the notch.

A failure resistant system for delivering a fluid through a pipe is also provided. In a general embodiment the system comprises a plurality of the pipe joints provided above, in which the female joint member is a pipe bell, in which the pipe bell is joined to a second pipe.

The foregoing presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

A. Definitions

Figure 1:
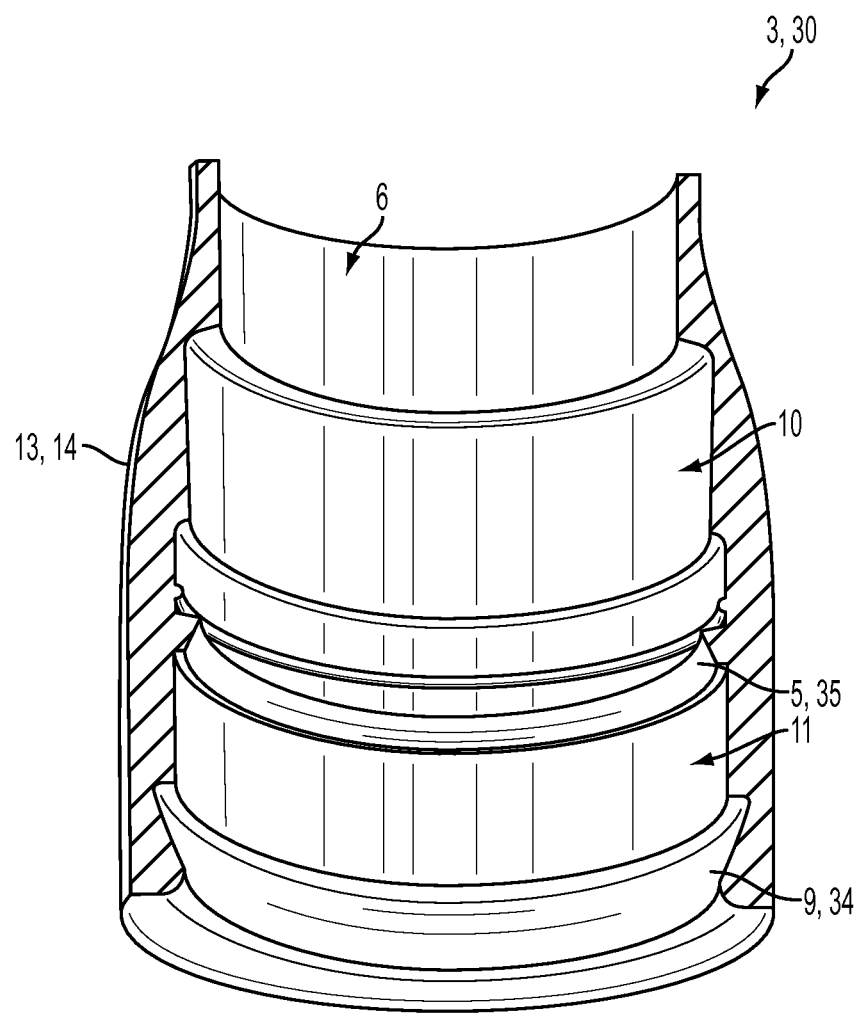
FIG. 1: A perspective view of an embodiment of the joint showing a cutaway of the female joint member.

With reference to the use of the word(s) "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

Unless stated otherwise, the term "consisting essentially of" means that, in addition to the recited elements, what is claimed may also contain other elements (steps, structures, ingredients, components, etc.) that do not adversely affect the operability of what is claimed for its intended purpose.

The terms "about" or "approximately" mean within a range of reasonable error around a central value. Such reasonable error may for example stem from the precision of an instrument or method used to measure the value. The error could also stem from the precision of a method of making a structure. For example, in some contexts these terms may mean +/−10%. In others these terms may mean ±20%.

The terms "distal" and "proximal" mean directions on a structure that are toward the terminal end (distal) or away from the terminal end (proximal). In the context of this disclosure, "distal" will mean the axial direction toward the open end of the female joint member (i.e., the direction from the constriction toward the groove), and "proximal" will mean the axial direction away from the open end of the female joint member (i.e., the direction from the groove toward the constriction).

The term "axial" in this disclosure refers to the axis of flow in a pipe or similar structure.

The term "circumferential" in this disclosure refers to angular position, motion or direction around a centerline that is parallel to the axis of flow in a pipe or similar structure.

The term "deflection" means an angular deviation from a given axis. For example, deflection occurs between a male joint member 2 and a female joint member 3 when the axis of one is shifted so as to no longer be generally parallel to the other.

B. Pipe Joint

A separation-resistant pipe joint 1 is provided. The joint 1 comprises a male joint member 2 and female joint member 3, in which a raised stop 4 on the male joint member 2 has clearance to move between a constriction 5 on the inner surface 6 of the female joint member 3 and a locking ring segment 8. Thus the male 2 and female 3 joint members may be axially displaced relative to one another without separation under stress (this property is referred to in some places as "axial flexibility"). Furthermore, the male 2 and female 3 joint members may be deflected without separation under stress, due to the shape of a circumferential groove 9 that accommodates a locking ring segment 9 and a reverse taper region 10 toward the proximal portion of the female joint member 3.

A general embodiment of the joint 1 comprises a female joint member 3, said female joint member 3 comprising: (a) an inner surface 6; (b) a circumferential groove 9 on the inner surface 6 to accommodate a locking ring segment 8, said circumferential groove 9 having a shape consisting essentially of a frustum of an ellipsoid defined by two generally parallel planes each intersecting the ellipsoid such that the center of the ellipsoid is not between the two generally parallel planes; (c) a constriction 5 on the inner surface 6 proximal to the circumferential groove 9, the constriction 5 having a constriction diameter; (d) an unobstructed traverse region 11 between the groove 9 and the constriction 5 having a regional diameter that is greater than the constriction diameter; and (e) an unobstructed reverse taper region 10 proximal to the constriction 5, having a second regional diameter that is greater than or equal to the constriction diameter and which increases in the proximal direction.

Another general embodiment of the joint 1 comprises a female joint member 3 comprising: (a) means to restrain a weld bead 33 on a pipe spigot 29 from removal due to excessive extension; (b) means to retain the restraining means 34 and to permit said restraining means to deflect in any direction; (c) means to restrain the weld bead from excessive insertion 35; (d) an unobstructed traverse region 11 between element (a) and element (b) having an axial length sufficient to allow at least 2" (5 cm) of axial displacement of the weld bead 27; and (e) an unobstructed reverse taper region 10 proximal to element (c), having a second regional diameter greater than that of the spigot 29 that increases in the proximal direction. The means to restrain the weld bead 33 from removal may be any known in the art, or it may be any of the locking ring segments 8 disclosed herein. The means to retain the restraining means 34 may be any known in the art, or it may be any of the circumferential grooves 9 disclosed herein. The means to restrain the weld bead from excessive insertion 35 may be any known in the art, or it may be any of the constrictions disclosed herein.

Figure 11:
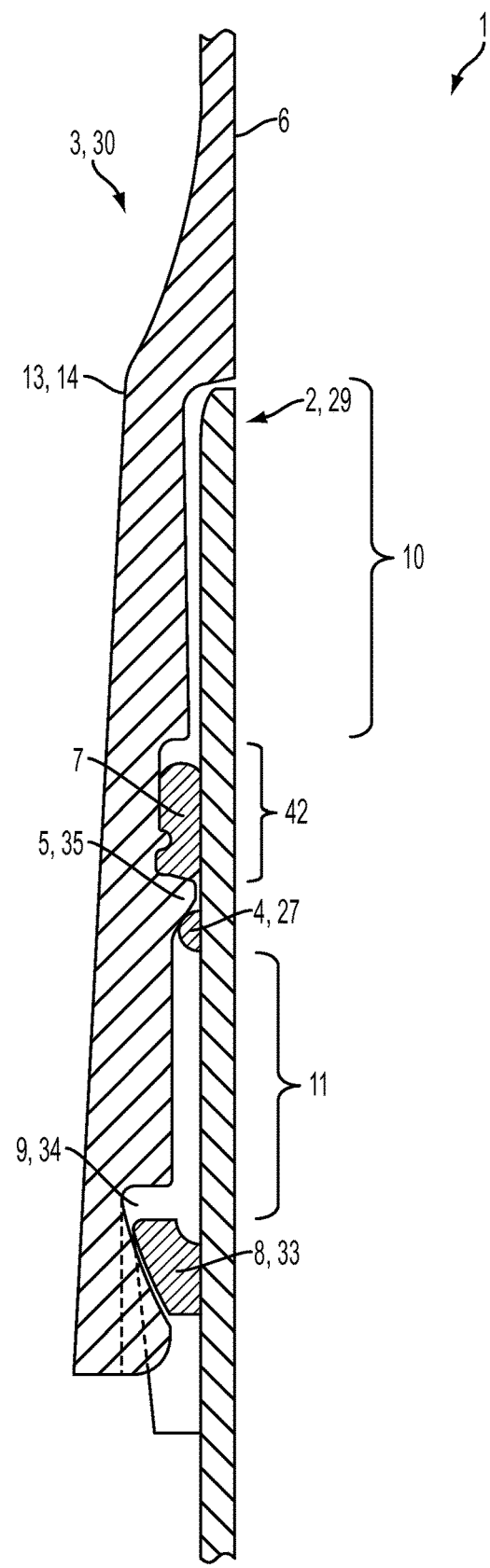
FIG. 11: A cross-sectional view of the embodiment of the female joint member shown in FIG. 1.

Such embodiments of the female joint member 3 are illustrated in FIGS. 1 and 11.

Figure 2:
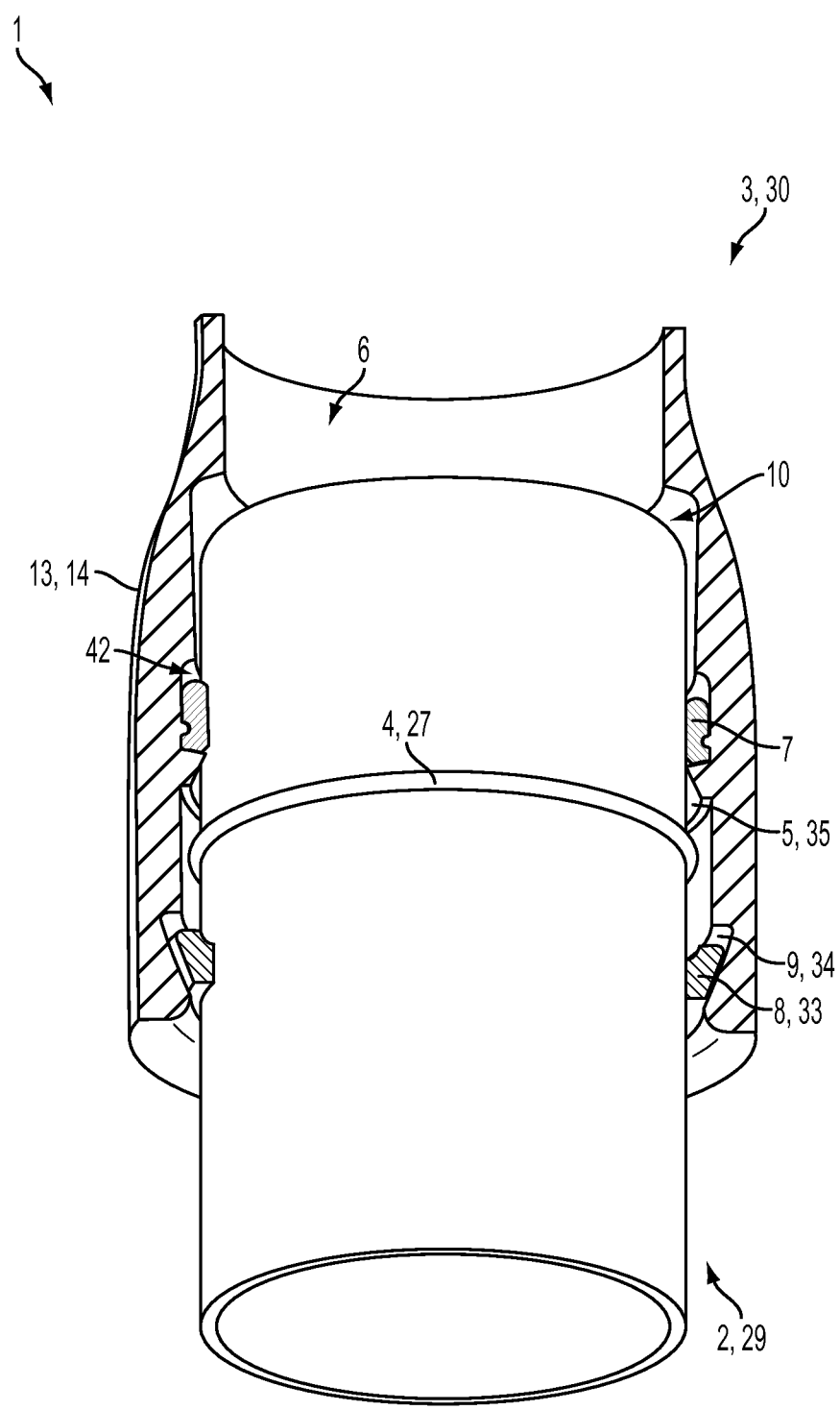
FIG. 2: A perspective view showing a cutaway of the female joint member of the embodiment shown in FIG. 1, in which the male joint member is axially positioned so that the raised stop is between the locking ring segment and the constriction.
Figure 6:
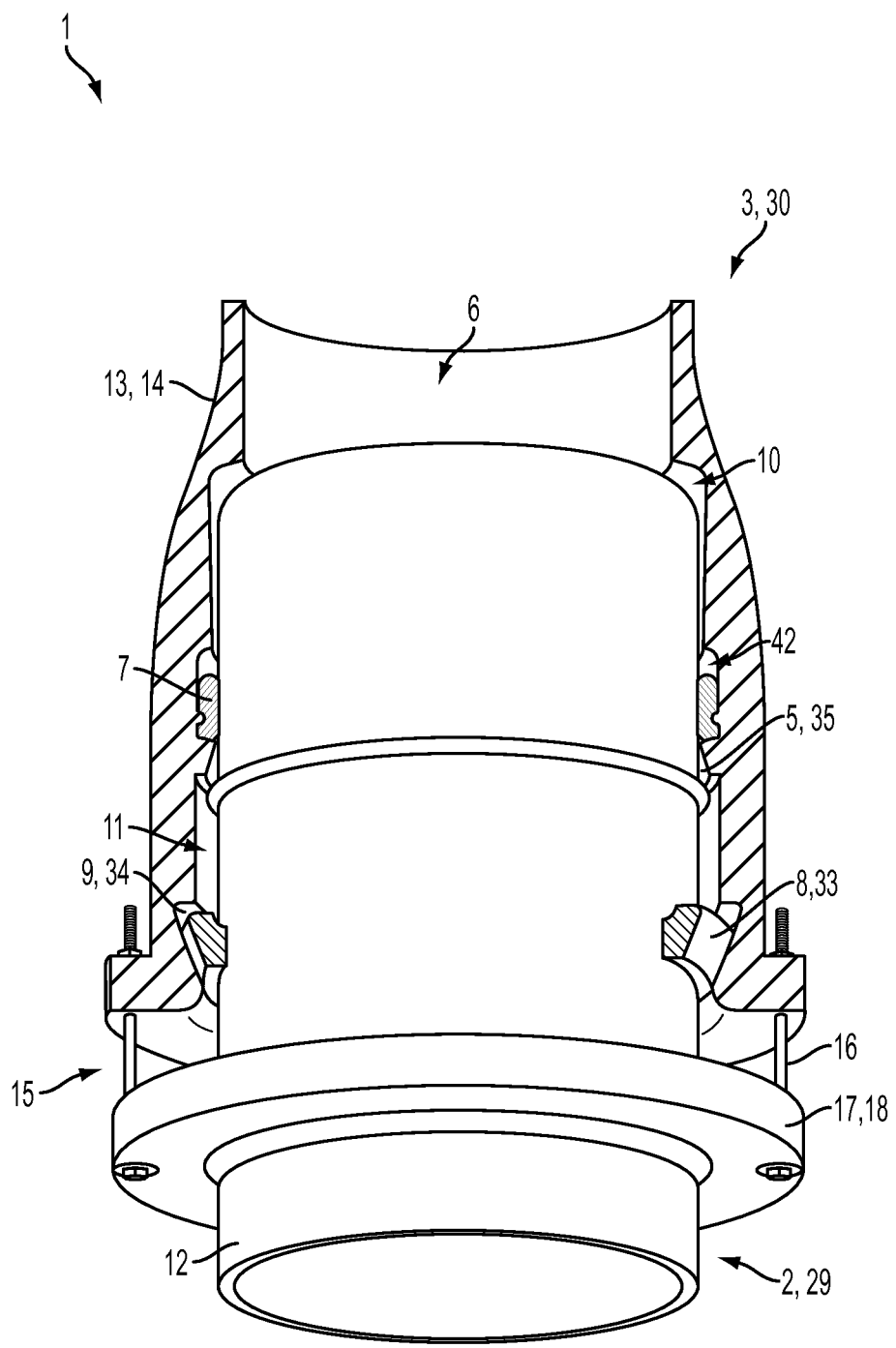
FIG. 6: An embodiment of the joint comprising a restraint fastened to the female joint member and the male joint member.

In an embodiment of the assembled joint 1, the joint 1 comprises a locking ring segment 8 in the circumferential groove 9, the locking ring segment 8 having a shape complementary to the shape of the groove 9; and a male joint member 2 inserted into the female joint member 3, the male joint member 2 comprising an outer surface 12 and a raised stop 4 on the outer surface 12 positioned between the locking ring segment 8 and the constriction 5, having a stop diameter greater than the constriction diameter and less than the regional diameter. Exemplary embodiments of the assembled joint 1 are shown in FIGS. 2 and 6.

The male joint member 2 is configured to be inserted into the female joint member 3. As such it may generally be considered a "spigot," 29 although other types of male joint members 2 are possible. In addition to the outer surface 12, the male joint member 3 will in many embodiments comprise an inner conduit to carry fluid, including an inner surface. The fluid may be, for example, a liquid, a typical example of which would be water (including freshwater and wastewater). In some embodiments of the joint 1 the male joint member 2 is a pipe spigot 29 comprising a circumferential weld bead 27.

The male 2 and female 3 joint members may be constructed from any suitable material, including polymers such as polyvinyl chloride, ceramic, wood, stone, concrete, and metal. Some embodiments of the joint members are constructed from copper, aluminum, iron, steel, or an alloy of any of the foregoing. In a specific embodiment the joint member is constructed from ductile iron. The members may also be coated, for example with a galvanizing layer, such as zinc.

The outer surface 12 of the male joint member 2 may take many forms, so long as it fits into the female joint member 3. In some embodiments the outer surface 12 of the male joint member 2 forms a cylinder.

The raised stop 4 on the outer surface 12 of the male joint member 2 is a region of increased outer diameter ("stop diameter") connected to or constructed on the outer surface 12 in such a way that the male joint member 2 does not move relative to the stop 4. Thus, if the stop 4 encounters an obstruction it can arrest movement of the male joint member 2. Some embodiments of the raised stop 4 may be part of the cast shape of the male joint member 2. Other embodiments are separate structures that are attached to the male joint member 2. In a specific embodiment the stop 4 is a weld bead 27 going around the circumference of the outer surface 12. The weld bead 27 has the advantage of being easily installed on the male joint member 2 either during manufacture or on site, and can be used to retrofit a previously existing spigot 29. The raised stop 4 may be continuous or interrupted, so long as it will contact the constriction 5 and the locking ring segment 8 in a manner to arrest axial displacement.

The locking ring segment 8 is a structure that is placed within the groove 9.

The female joint member 3 is configured to allow insertion of the male joint member 2. As such it may generally be considered a "bell" or "socket," although other types of female joint members 3 are possible. The inner surface 6 defines a fluid conduit. The fluid may be, for example, a liquid, a typical example of which would be water (including freshwater and wastewater). The fluid could also be a gas, such as fuel gas. In addition to the inner surface 6, the female joint member 3 comprises an outer surface 13.

The circumferential groove 9 is a region on the inner surface 6 of the female joint member 3 with a greater diameter than the surrounding regions. The female joint member 3 may be fabricated with the groove 9 as an integral part, the groove 9 may be made in the inner surface 6 of the female joint member 3 after fabrication, or the groove 9 may be formed by one or more separate structures that are fastened to the inner surface 6 of the female joint member 3. It accommodates the locking ring segment 8 in such a way as to limit the axial movement of the locking ring segment 8. The limitation on the axial movement of the locking ring segment 8 may be relatively absolute, in which case the locking ring segment 8 is not free to move any significant distance in an axial direction. In other cases the limitation on the axial movement may be less absolute, such that the locking ring segment 8 may move a small distance in an axial direction.

The constriction 5 on the inner surface 6 is a region having a smaller diameter than the adjacent regions ("constriction diameter"). When the joint 1 is assembled, the constriction 5 is on the opposite side of the raised stop 4 as the locking ring segment 8. The constriction 5 diameter is less than the diameter of the raised stop 4; thus the raised stop 4 cannot pass the constriction 5, and this limits the relative axial movement of the male 2 and female 3 joint members. In many embodiments the constriction 5 is cast as part of the integral shape of the female joint member 3. In some embodiments the constriction 5 may be machined into the inner surface 6 of the female joint member 2 after fabrication. In other embodiments the constriction 5 is formed by one or more separate structures that are fastened to the inner surface 6 of the female joint member 3. The constriction 5 may be continuous or interrupted, so long as the interruptions allow it to function to prevent the raised stop 4 from passing.

Between the circumferential groove 9 and the constriction 5 is the unobstructed traverse region 11 of the female joint member 3. The traverse region 3 has a regional diameter that is greater than the stop diameter, allowing the stop 4 to move axially in the traverse region 11. The regional diameter that is greater than the stop diameter may be a property of the entire traverse region 11, or there may be sub-regions with the greater diameter. For example, a possible embodiment comprises one or more grooves in the traverse region 11 that allow one or more raised stops 4 to move axially. The length of the traverse region 11 will vary depending on the size of the joint 1. The traverse region 11 is sufficiently long to allow a significant amount of axial flexibility in the joint 1. In some embodiments of the joint 1, the axial length of the traverse region 11 is about 30-45% of the inner diameter of the female joint member 3 at its narrowest point. In a specific embodiment of the joint 1, the axial length of the traverse region 11 is about 37.5% of the inner diameter of the female joint member 3 at its narrowest point. In embodiments of the joint 1 in which the female joint member 3 is a pipe bell 30, and in which the pipe bell 30 is joined to a second pipe 31 having a second pipe axial length, the axial length of the traverse region 11 may be defined by the axial length of the second pipe 31. For example, in some embodiments of the joint 1, the axial length of the traverse region 11 is at least about 0.2%, at least about 0.5%, about 0.2-1.0%, or about 0.5-1.0% of the second pipe axial length. In a particular example, the interior diameter of the female joint member 3 is 6" (15 cm), the distance from the raised stop 4 to the distal end of the male joint member 2 is 5.75" (14.6 cm), and the length of the traverse region 11 is 2.25" (5.7 cm).

Some embodiments of the female joint member 3 have an outer surface 13 with a streamlined shape. The streamlined shape has the advantage of posing less resistance to a shifting matrix, for example during a geologic or seismic event when the joint 1 may be moving relative to the soil. In such embodiments the female joint member 3 comprises a streamlined outer surface 14 that increases in diameter in the distal direction. The degree of increase in the distal direction may be defined according to the angle of increase. In some versions of the streamlined 14 female joint member 3, the increase in diameter does not exceed about 10° at any point. In further embodiments, the increase in diameter is no more than about 6° at any point. In further embodiments, the increase in diameter is no more than about 3-10° at any point. In embodiments of the female joint member 3 in which the female joint member 3 is a pipe bell 30 joined to a second pipe 31 at its proximal end, the degree of increase in the distal direction may be defined according to the angle of increase between the groove 9 and the point at which the bell 30 is joined to the second pipe 31. In such embodiments, the angle of increase in diameter between the groove 9 and the point at which the bell 30 is joined to the second pipe 31 does not exceed a value selected from the group consisting of: 3, 6, and 10°. In a further such embodiment the angle of increase in diameter between the groove 9 and the point at which the bell 30 is joined to the second pipe 31 is about 3-10°.

In some embodiments of the joint 1, a restraint 15 maintains the relative axial positions of the male 2 and female 3 members. This has the advantage of preventing the male joint member 2 from slowly extending from the female joint member 3 due to the internal fluid pressure near places where the direction of the flow or diameter of the conduit changes, which will naturally tend to cause such extension over time. The restraint 15 is an external structure fastened to both joint members. The restraint 15 is positioned to maintain the relative positions of the male 2 and female 3 joint members such that the raised stop 4 remains positioned between the locking ring segment 8 and the constriction 5, and the restraint 15 is designed to fail when exposed to stress exceeding an axial stress threshold. The axial stress threshold will be greater than the stress the pipe is designed to handle under normal conditions. In many situations this can be calculated by multiplying the internal fluid pressure the pipe is designed to carry times the cross-sectional area of the pipe (outer radius squared times pi). The stress threshold will in many cases include a margin of safety to prevent the restraint 15 from failing due to transient spikes in fluid pressure. For example, the stress threshold may be greater than twice the internal fluid pressure the pipe is designed to carry times the cross-sectional area of the pipe. For example, in a municipal water system with internal pressures typically in the range of 80-120 psi (516-827 kPa), a restraint could be used that fails at stresses above those that would be caused by an internal pressure of 240 psi (1655 kPa); this would be a force that is the product of 240 psi (1655 kPa) multiplied by the cross-sectional area of the pipe. So, for a 6" (15 cm) pipe, in this example the stress threshold would be above 6794.4 lb (30.223 kN). One of ordinary skill in the art could calculate the necessary stress threshold based on the intended internal pressure of the pipe for a variety of situations.

Ideally the stress threshold will be below the expected stress from a disaster event. The failure of the restraint 15 will allow relative displacement of the male 2 and female 3 members, potentially saying the joint 1 from separation. The maximum value of the stress threshold will depend on the nature of the anticipated disaster. Some embodiments of the restraint 15 will have a stress threshold that is below the generally accepted stresses an earthquake resistant pipe must endure. One of ordinary skill in the art can refer to industry standards for earthquake resistant pipe. For example, ISO 16134 "Earthquake- and subsidence-resistant design of ductile iron pipelines " (2006) provides standards for four classes of earthquake resistant pipe based on slip-out resistance in Table 2. The lowest class of earthquake resistance, Class D, will resist slip-out to a level of less than 0.75 kN/mm times the diameter of the pipe in mm. In one embodiment of the restraint, the stress threshold is below 0.75 kN/mm times the diameter of the pipe. In the case of a 6" (15 cm) pipe in such an embodiment, the stress threshold would be below about 112.5 kN (25291 lb) In a specific embodiment of the restraint, the stress threshold is from about 1655 kPa times the cross-sectional area of the pipe to above 0.75 kN times the diameter of the pipe.

One embodiment of the restraint 15 comprises a restraining ring 17 fastened to the male joint member 2 and connected to the female joint member 3 by one or more bolts 16. Some portion of the restraint 15 is designed to fail above the threshold stress. This may be, for example, the bolt 16. The restraining ring 17 may be fastened to the male joint member 2 in a variety of ways. For example, it may be welded to the male joint member 2, as shown in FIG. 6. In other embodiments the restraining ring 17 may be a clamp ring 18, in which case it may be clamped on the male joint member 2. It is further contemplated that the restraining ring 17 may be bolted or glued to the male joint member. In a specific embodiment the restraining ring 17 is an integrally cast part of the male joint member 2. Such an integrally cast restraining ring 17 has the advantage of great structural strength. Retaining rings 17 that are fastened to the male joint member 2 after casting have the advantage of ease of installation in the field, and can be installed on a pipe spigot 29 that has not been specially fabricated.

It is contemplated that upon assembly the male 2 and female 3 joint members will be positioned such that the raised stop 4 will be located at some point in the traverse region 11. In embodiments of the joint 1 comprising the restraint 15, the restraint 15 will serve to maintain such a position during normal operation. Some embodiments of the joint 1 are assembled with the raised stop 4 closer to the constriction 5 than to the groove 9 (see for example FIGS. 2 and 6). In further embodiments, the ratio of the value of the distance from the groove 9 to the raised stop 4 and the value of the distance from the groove 9 to the constriction 5 is selected from: 50%, 60%, 70%, 75%, 80%, 85%, 90%, 95%, 99%, 100%, a range between any two of the foregoing values, or at least any of the foregoing values. In a specific embodiment the joint 1 is assembled with a ratio of the value of the distance from the groove 9 to the raised stop 4 and the value of the distance from the groove 9 to the constriction 5 of about 82%; an example of such an embodiment is a 6" pipe socket with a distance from the groove 9 to the constriction 5 of 2.84" in which the joint 1 is assembled with the raised stop 4 0.5" from the constriction 5 and 2.34" from the groove 9. Assembling the joint 1 with the raised stop 4 closer to the constriction 5 than to the locking ring segment 8 has the advantage of allowing a large degree of displacement by extending the total length of the joint 1; this is particularly advantageous because joint failure is more likely to occur when an extending force is applied than when compressing force is applied during seismic events.

Figure 8A:
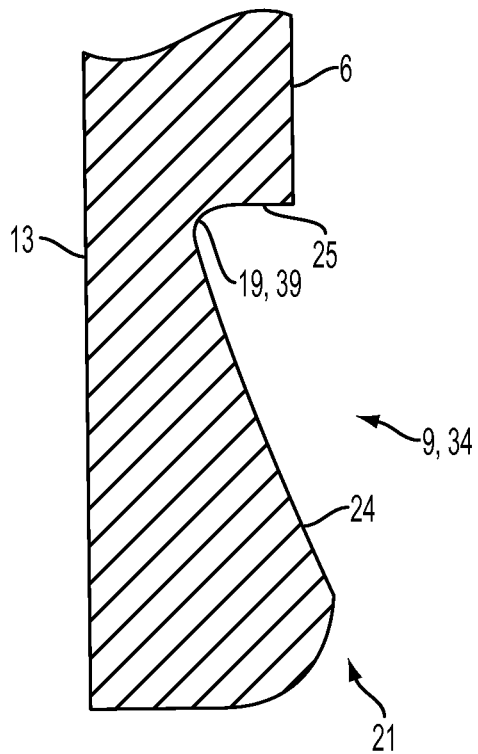
FIG. 8: Cross-sectional detail of three embodiments of the circumferential groove. 8A shows an embodiment of the groove in which the corner between the distal surface and the proximal surface is a rounded corner. 8B shows an embodiment of the groove in which the corner between the distal surface and the proximal surface is a sharp corner. 8C shows an embodiment of the groove in which the corner between the distal surface and the proximal surface is a beveled corner.
Figure 8B:
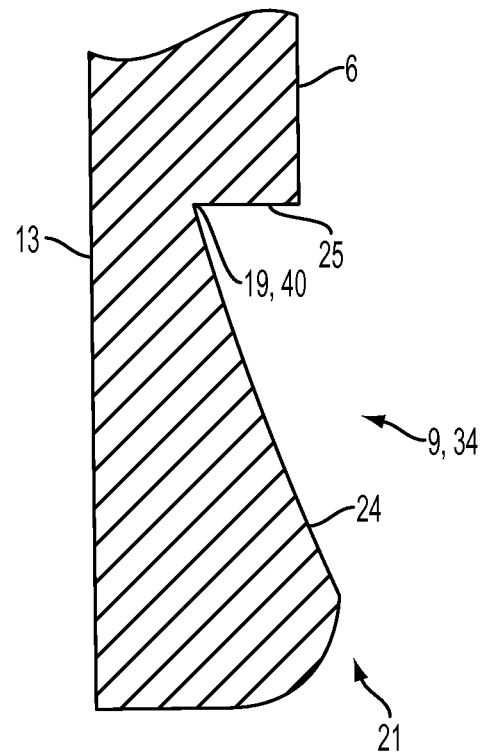
Figure 8C:
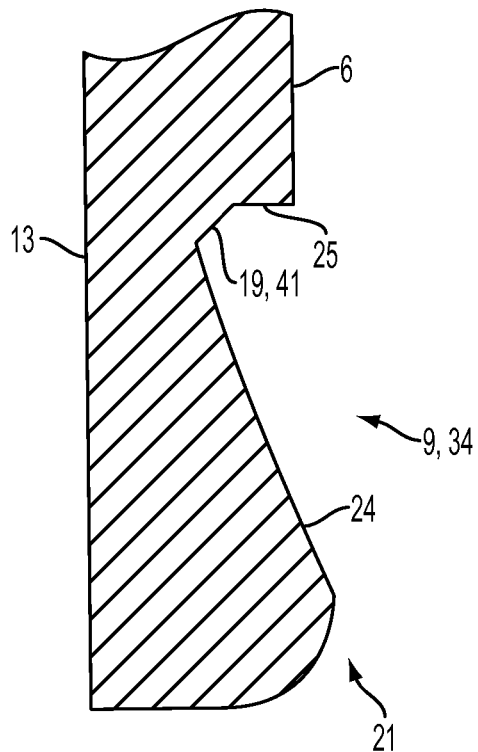

The groove 9 has a shape consisting essentially of a frustum of an ellipsoid defined by two generally parallel planes each intersecting the ellipsoid such that the center of the ellipsoid is not between the two generally parallel planes. The term "ellipsoid" includes a sphere, and in a specific embodiment the ellipsoid is a sphere. The frustum is thus defined by the two parallel planes and by the curved surface of the ellipsoid between the two planes. In some embodiments of the groove 9, such as the ones illustrated in FIG. 8, the plane on the distal side will not actually be manifested as a surface forming the groove 9. In such embodiments the groove 9 comprises a distal surface 24 defined by the curved surface of the ellipsoid and a proximal surface 25 defined by the proximal plane, and in which the distal surface 24 and the proximal surface 25 meet at a corner 19. In this specific context, the term "consisting essentially" means that the distal surface 24 will not significantly deviate from the shape of the curved surface of the ellipsoid, and will meet the proximal surface 25 at a corner 19; however the less critical proximal surface 25 may contain minor deviations, such as a depression 26 in the proximal plane at an edge of the groove 9 allowing the insertion of a locking ring segment 8 having an arcuate length greater than the arcuate length of the notch 20. Absent such a depression 26 it would not be possible to insert a locking ring segment 8 into the groove 9 with an arcuate length exceeding that of the notch 20.

Some embodiments of the groove 9 consists of the distal surface 24 defined by the surface of the ellipsoid and the proximal surface 25 defined by the proximal plane (i.e., there is no significant deviation from either of these shapes).

The distal surface 24 and proximal surface 25 may meet at various types of corners 19. Examples include a rounded corner 39, a sharp corner 40, and a beveled corner 41. In this context the term "corner" 19 cannot be interpreted to mean any shape that would radially widen the groove 9 beyond what is defined by the frustum.

The joint 1 may contain a gasket 7 between the constriction 5 and the reverse taper region 11. The gasket 7 functions to provide a fluid-tight seal between the male 2 and female 3 joint members. The gasket 7 may be made of any suitable material known in the art, such as polymer rubber or silicone. There may be a gasket groove 42 between the constriction 5 and the reverse taper region 11 to accommodate the gasket 7. Generally the gasket 7 will be positioned so that the seal will be maintained even when the male joint member 2 is fully extended (i.e., the raised stop 4 is in contact with the locking ring segment 8).

Some embodiments of the joint 1 comprise a notch 20 that widens the mouth 21 of the female joint member 3 over an arc that is less than 180°. The notch 20 allows the insertion and removal of a locking ring segment 8 without disassembly of the joint 1. Accordingly, in some embodiments, the notch 20 widens the mouth 21 of the female joint member 3 over an arc that is at least as large as the arc of the locking ring segment 8. Some embodiments of the notch 20 widen the mouth 21 of the female joint member 3 over an arc of about 90°. A notch 20 of greater arcuate length has the advantage of allowing the insertion of a locking ring segment 21 of greater arcuate length; whereas a notch 20 of lesser arcuate length has the advantage of providing greater strength to the female joint member 3.

The female joint member 3 may comprise more than one notch 20 that widens the mouth 21 of the female joint member 3 (although in some embodiments there will be only one notch 20). Some embodiments of the female joint member 3 comprise two notches (a first notch 20 and a second notch 43). In further such embodiments the first 20 and second 43 notches each widens the mouth 21 of the female joint member 3 over an arc of about 90°. In a specific embodiment the two notches 20 and 43 are positioned 180° from one another. Such positioning of the notches 20 and 43 has the advantage that the joint 1 may be installed at any rotational orientation while always providing a notch 20 that is at least partially in the top half of the mouth 21 of the female joint member 21, which causes the locking ring segments 8 to be maintained in place by force of gravity.

The locking ring segment 8 is a ring or an arc of a ring, shaped to fit within the circumferential groove 9. Thus the shape of the locking ring segment 8 and the shape of the groove 9 depend on one another. When within the circumferential groove 9, the radial distance from the centerline of the female joint member 3 to the inner surface of the locking ring segment 8 will be smaller than the radial distance from the centerline to the outer surface of the raised stop 4 when the male joint member 2 is inserted into the female joint member 3. Thus the stop 4 cannot pass the locking ring segment 8. Some embodiments of the locking ring segment 8 and circumferential groove 9 are configured to provide additional flexibility to the joint 1 by permitting deflection between the male 2 and female 3 joint members without separation. For example, the locking ring segment 8 may have a distal surface that is the shape of a frustum of the ellipsoid that defines the shape of the groove 9. Embodiments of the joint 1 comprising a circumferential groove 9 that is frusto-ellipsoidal and a locking ring segment 8 of complimentary shape and dimensions have the advantage that the ring 8 and groove 9 will behave like a universal joint. The locking ring segment 8 may deflect in any direction relative to the groove 9. The total degree of deflection will be limited by the amount of overlap between the male 2 and female 3 joint members. This imparts increased flexibility to the joint 1, allowing it to resist separation when under shear.

When the locking ring segment 8 has a shape that tapers in the proximal direction, an extending force will cause the raised stop 4 to push against the locking ring segment 8, which will in turn cause the tapered surface to push against the groove 9, which will then impart a force vector that will press the locking ring segment 8 against the outer surface 12 of the male joint member 2. When the locking ring segment 8 is pressed against the outer surface 12 of the male joint member 2 it will not permit the raised stop 4 to pass, preventing separation.

The locking ring segment 8 comprises a circumferential arc 28. One example comprises two nearly semicircular ring segments 8, or a split ring. Another such example comprises one or more ring segments 8 each defining a circumferential arc 28 of less than about 180°. A more specific example comprises two ring segments 8 and 36 each defining a circumferential arc of less than about 180°. Further examples comprise one or more ring segments 8 each defining a circumferential arc 28 of less than about 90°. Still further examples comprise one or more ring segments 8 each defining a circumferential arc 28 of less than about 45°. It will of course be understood that any number of ring segments 8 may be used, so long as the sum of the circumferential arcs 28 of the ring segments do not exceed 360°. The sum of the arcs 28 of the ring segments 8 may be less than 360°. Embodiments of the joint 1 in which the sum of the arcs 28 of the ring segments 8 is smaller have the advantage of lower weight (and potentially easier installation). Embodiments of the joint 1 in which the sum of the arcs 28 of the ring segments 8 is larger have the advantage of increased contact area between the ring segments 8 and the circumferential groove 9, which increases the separation resistance of the joint 1.

If the female joint member 3 comprises a notch 20 that widens the mouth 21 of the female joint member 3 over an arc that is at least as large as the arc 28 of the locking ring 8 segment (as shown in FIGS. 3, 4, 7, and 10), the locking ring segment 8 may be installed after the male joint member 2 has been placed inside the female joint member 3. In such embodiments, the locking ring segment 8 can be inserted into the circumferential groove 9 through the notch 20, and then slid into another section of the circumferential groove 9 such that the ring segment 8 will abut the proximal wall of the groove 9. A female joint member 3 with fewer notches 20 or smaller notches 20 has the advantage of greater structural strength.

Figure 3:
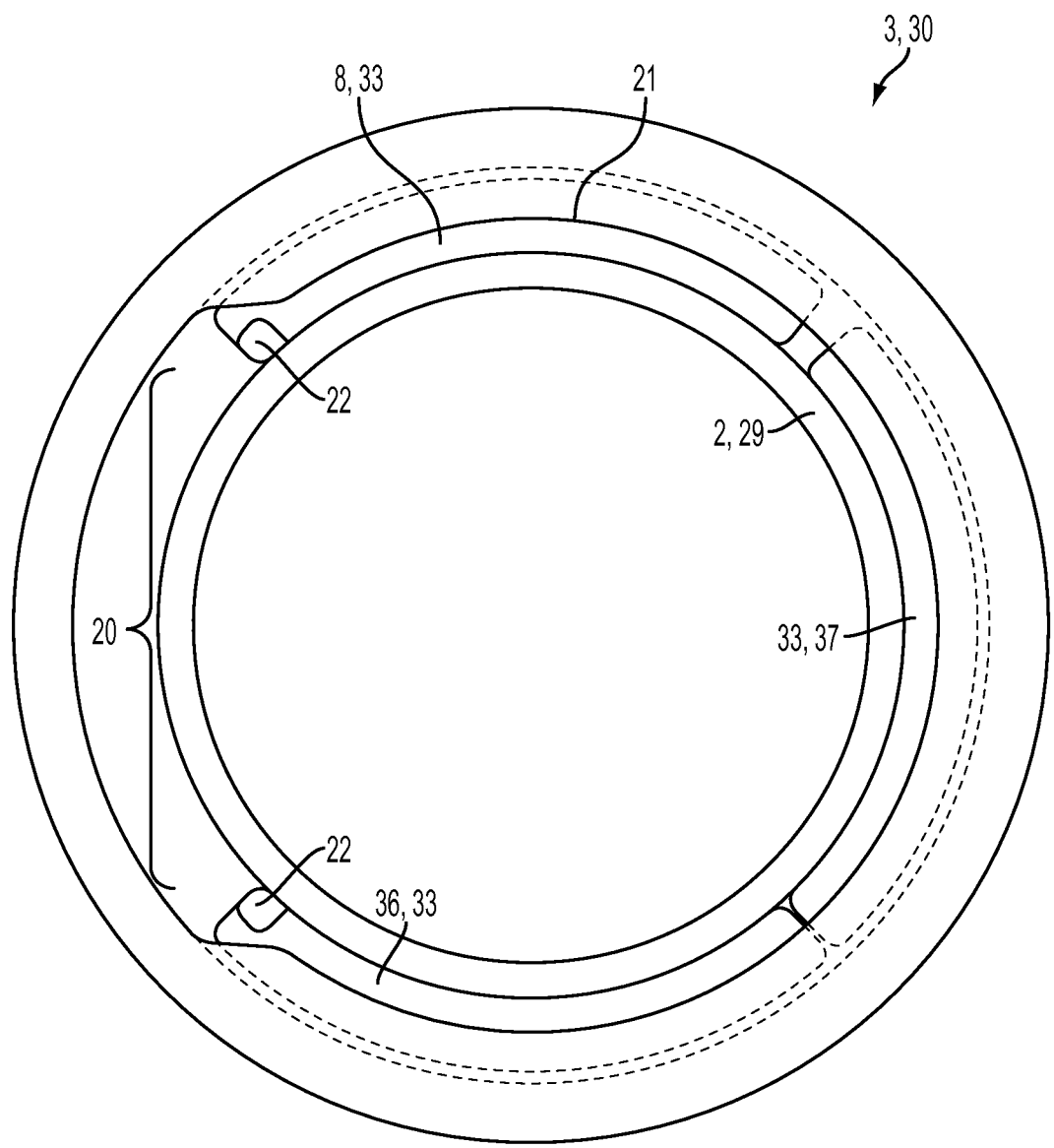
FIG. 3: A front view of an embodiment of the female joint member, comprising a notch, and showing locking ring segments inserted (dashed lines showing the positioning of three locking ring segments inserted into the groove).
Figure 4:
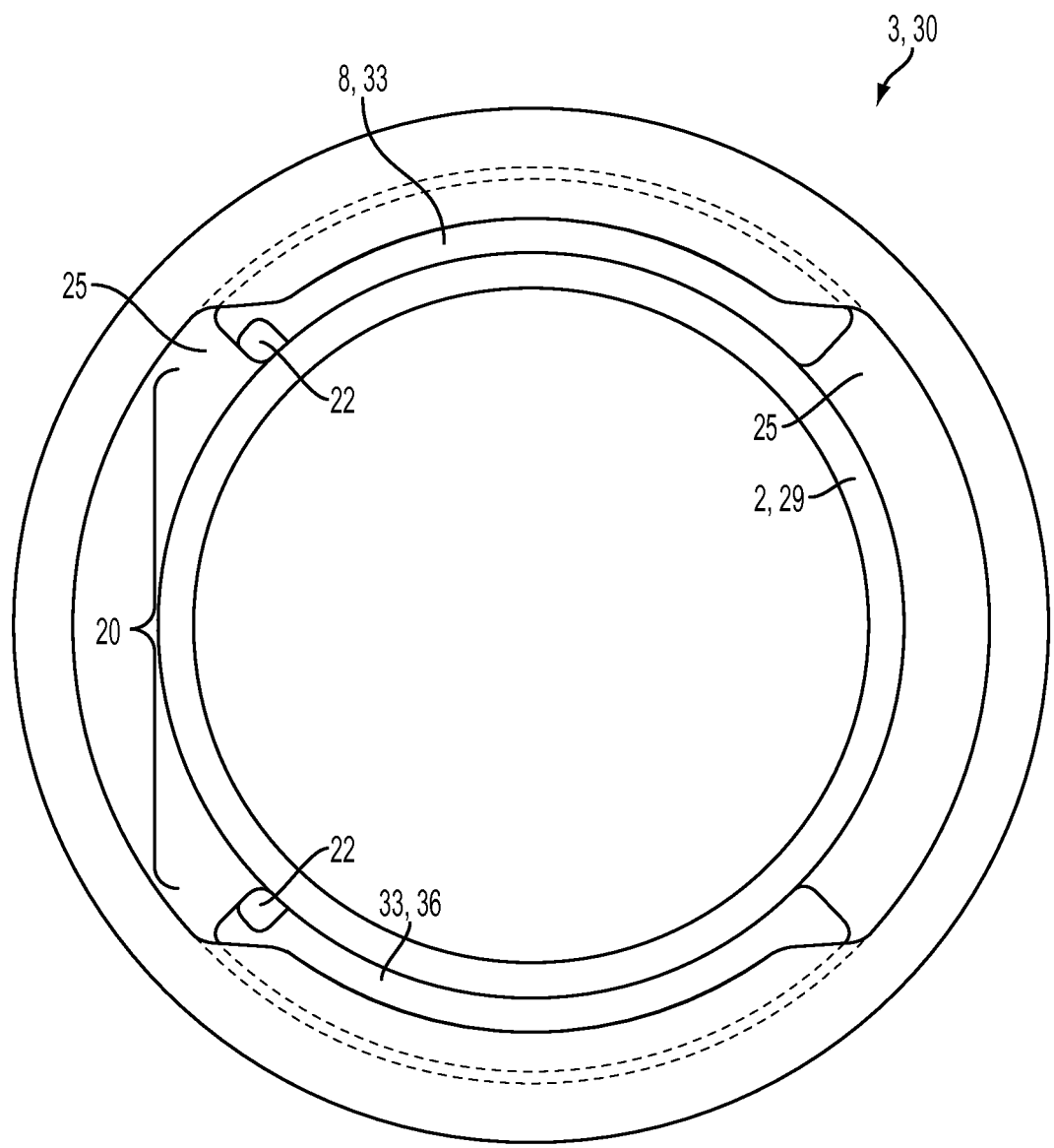
FIG. 4: A front view of an embodiment of the female joint member, comprising two notches, and showing locking ring segments comprising tabs inserted (dashed lines showing the positioning of two locking ring segments inserted into the groove).

Various configurations of the locking ring segments 8 can be used to confer corresponding advantages. One embodiment of the joint 1 comprises two locking ring segments 8 and 36 each defining a circumferential arc 28 of about 90°. A more specific embodiment of the joint comprises two locking ring segments 8 and 36 each defining a circumferential arc 28 of about 90°, and each comprising a tab 22 (as shown in FIG. 4). In this embodiment the joint 1 comprises one or two notches 20 that widen the mouth 21 of the female joint member 3 over an arc of about 90°. Another embodiment of the joint 1 comprises one notch 20 that widens the mouth 21 of the female joint member 3 over an arc of about 90° and three locking ring segments 8, 36 and 37, two of which each comprise a tab 22 (as shown in FIG. 3).

Figure 5A:
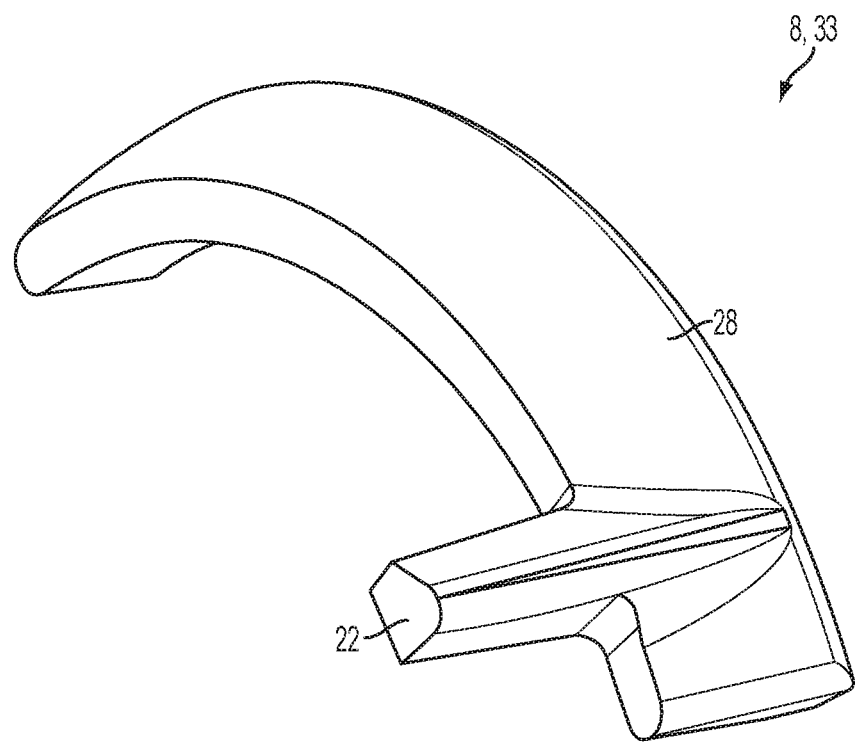
FIG. 5A: An embodiment of the locking ring segment comprising a tab in which the arc of the locking ring segment extends beyond the point where the tab meets the arc.
Figure 5B:
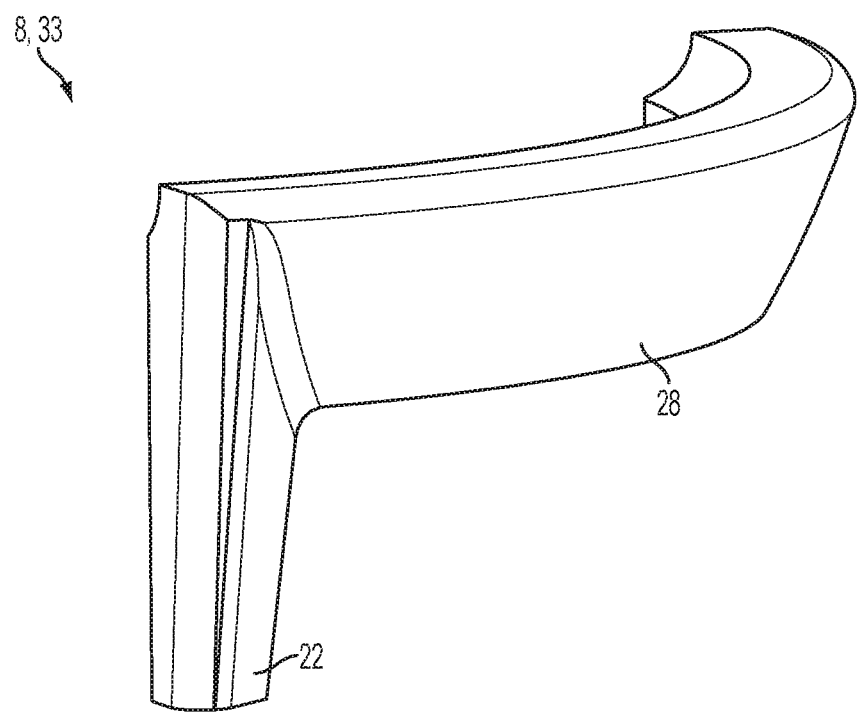
FIG. 5B: An embodiment of the locking ring segment comprising a tab in which the arc of the locking ring segment terminates at the point where the tab meets the arc.

As indicated above, the locking ring segment 8 may comprise a tab 22 (as shown in FIGS. 5A and 5B). The tab 22 is a protrusion from the arc 28 of the locking ring segment 8 that allows the locking ring segment 8 to be easily removed from the groove 9 through the notch 20. Some embodiments of the tab 22 extend axially distally; in such embodiments the tabs 22 prevent the locking ring segments 8 from sliding into the groove 9 away from the notch 20. Such embodiments have the advantages of keeping the locking ring segments 8 in place relative to the notch 20 and allowing the locking ring segment 8 to be removed by grasping the tab 22 and sliding the locking ring segment 8 into the groove.

In a specific embodiment the locking ring segment 8 comprises a tab 22 extending axially distally in regard to the female joint member 3, in which the arc 28 of the locking ring segment 8 extends beyond the point where the tab 22 meets the arc 28 (as shown in FIG. 5A). When inserted into the groove 9 through the notch 20, the portion of the arc 28 of the locking ring segment 8 that extends beyond the point where the tab 22 meets the arc 28 will remain in the notch 20. It has been found that during seismic events, pipe spigots 29 will distend or "ovalize" if the spigot 29 deflects too far, and that the presence of a notch 20 in the bell makes the spigot 29 particularly vulnerable to ovalization and failure. Deflection of the spigot 29 into contact with the mouth of the bell 30 at the location of a notch 20 under extreme stresses has been discovered to result in deformation of the spigot 29 that causes the raised stop to disengage from the locking ring segment 8, and ultimately separation of the joint. The same type of ovalization has been observed in joints subjected to extreme axial extension stresses. The placement of a locking ring segment 8 that extends into the notch will serve to discourage ovalization of the spigot 29 by reducing the required circumferential size of the notch 20 and by providing additional resistance to radial movement of the male pipe joint member 2. The use of a locking ring segment 8 comprising a portion of its arc 28 that extends beyond the point where the tab 22 meets the arc 28 will partially occupy the gap formed by the notch 20, and aid in resisting such ovalization of the spigot 29 during extreme stress events.

Figure 7:
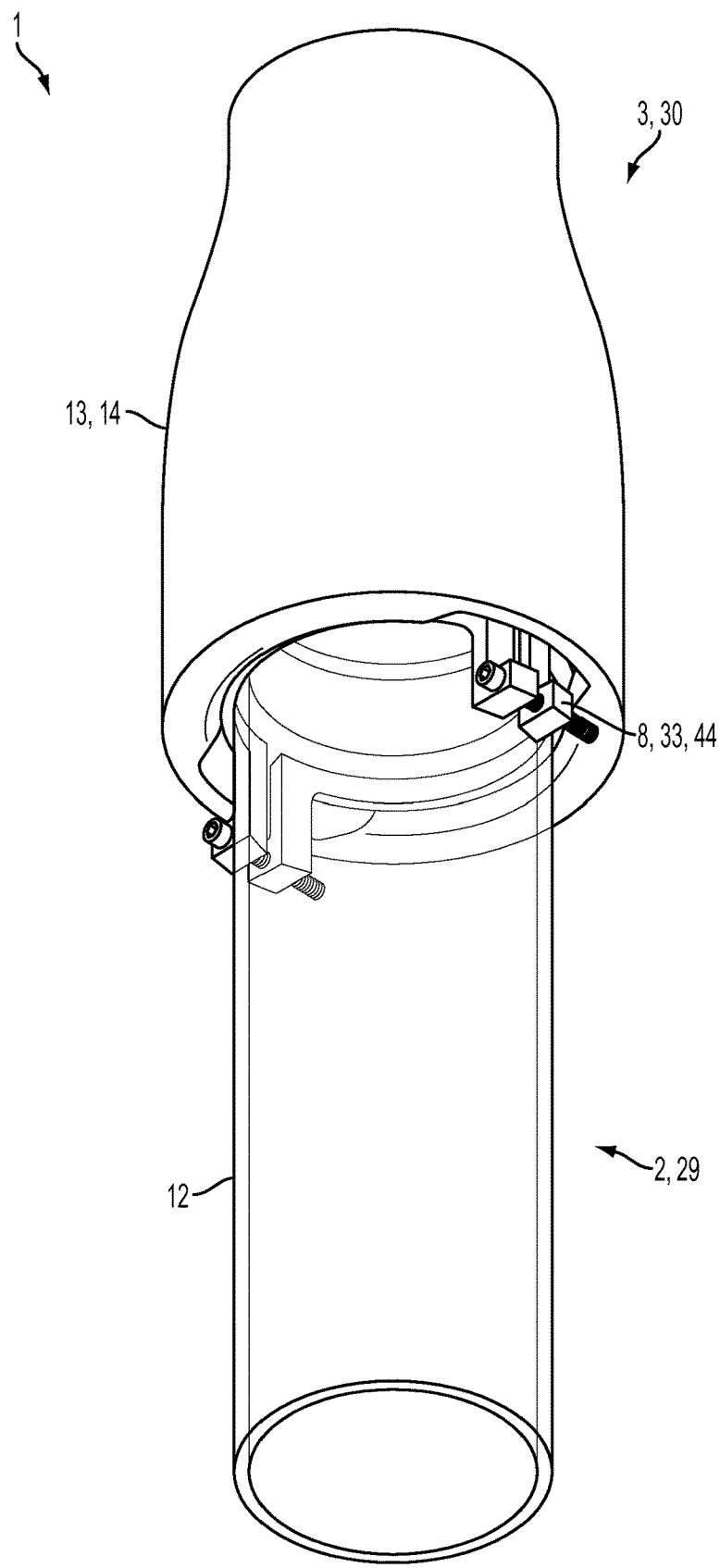
FIG. 7: An embodiment of the joint in which the locking ring segment is a split ring configuration.

The locking ring segment 8 may be a split ring 44 (as shown in FIG. 7). Split rings 44 have the advantage of ease of installation, as they readily expand, and can be placed over the male joint member 2 after the male joint member 2 has been assembled with the female joint member 3. In some such embodiments, the ring is a single-split ring having one gap. If the locking ring segments 8 take the form of a split ring 44, it may further comprise opposed locking flanges to allow adjustment of the width of the gap(s) and to allow tightening or loosening of the ring 44 on the male joint member 2. The single-split ring has the advantage of having only a single pair of opposed locking flanges at the notch 20. In embodiments of the joint comprising a split ring 44 having locking flanges, the notch 20 or notches may accommodate the flanges.

The unobstructed reverse taper region 10 is proximal to the constriction 5 (on the opposite side of the constriction as the groove 9). The reverse taper region 10 is "unobstructed" in that the male joint member 2 is not obstructed from sliding into this region until the raised stop 4 encounters the constriction 5. The unobstructed reverse taper region 10 increases in diameter in the proximal direction (i.e., it has a second regional diameter that is greater than or equal to the constriction diameter and which increases in the proximal direction). In some embodiments of the reverse taper region 10 the second regional diameter increases in a linear fashion in the proximal direction. This results in a thinning of the wall of the female joint member 3 in this region, but has the advantage of allowing greater deflection between the male joint member 2 and the female joint member 3 when the male joint member 2 is inserted to an extent that at least a portion of the male joint member 2 extends into the reverse taper region 10 (in many embodiments of the joint 1, such as the ones illustrated in FIGS. 2 and 6, a portion of the male joint member 2 will always extend into the reverse taper region 10 when functioning and properly installed). This additional flexibility further increases separation resistance during extreme events.

The joint 1 may comprise a low-friction polymer layer surrounding the joint. The polymer may be any suitable low-friction polymer, such as polyethylene or polyurethane. The layer may take the form of a bag that is placed around the joint 1 during or before installation. It may also take the form a sheet that is wrapped around the joint 1 during or before installation. Additional forms of the layer, such as a coating or a barrier, are also contemplated.

C. Method of Assembly

A method of assembling separation-resistant pipe joint 1 is provided, in which the pipe joint 1 comprises any of the female pipe joint members 3 described above and a male pipe joint member 2; the male pipe joint member 2 comprising a raised stop 4 on its outer surface 12 having a stop diameter; the female pipe joint member 3 comprising a notch 20 that widens the mouth 21 of the female joint member 3 over an arc of less than 180°; the method comprising: (a) inserting the male joint member 2 into the female joint member 3 to an extent that the raised stop passes 4 the groove 9; (b) inserting a locking ring segment 8 into the notch 20, the locking ring segment 8 having a shape complementary to the shape of the groove 9, and the locking ring segment 8 defining a circumferential arc 28 that is smaller than the arc of the notch 20; and (c) sliding the locking ring segment 8 into the groove 9 so that most of the locking ring segment 8 is no longer in the notch 20.

Conversely, a method of disassembling the joint 1 is provided, comprising: (a) sliding the locking ring segment 8 out of the groove 9 so that the locking ring segment 8 is no longer in the notch 20; (b) removing the locking ring segment 8 from the notch 20; and (c) removing the male joint member 2 from the female joint member 3.

In some embodiments the joint 1 will include a second locking ring segment 36. In such embodiments the method may comprise inserting the second locking ring segment 36 into the notch 20, the second locking ring segment 36 having a shape complementary to the shape of the groove 9, and the second locking ring segment 36 defining a circumferential arc 28 that is smaller than the arc of the notch 20; and sliding the second locking ring segment 36 into the groove 9 so that most of the second locking ring segment 36 is no longer in the notch 20. Three locking ring segments 8, 36 and 37 may also be inserted (or more). As noted above, the use of more than one locking ring segment 8 can provide greater contact area between the locking ring segment 8 and the raised stop 4 and between the locking ring segment 8 and the groove 9, without requiring an increase in the size of the notch 20 to insert the locking ring segments 8. In a specific embodiment, the method comprises inserting at least three locking ring segments 8, 36 and 37 into the notch 20, each said locking ring segment 8, 36 and 37 defining a circumferential arc 28 of about 90°.

Locking ring segments 8 with tabs 22 may be used for the reasons described above. In some embodiments of the method, the locking ring segment 8 comprises a tab 22 extending axially distally in regard to the female joint member 3, and the tab 22 remains in the notch 20 after sliding the locking ring segment 8 into the groove. Thus the tab 22 prevents the segment 8 from sliding too far into the groove 9 away from the notch 20 and facilitates its easy removal for disassembly purposes. In a specific embodiment, the method comprises inserting the second locking ring segment 36 into the notch 20, the second locking ring segment 36 having a shape complementary to the shape of the groove 9, and the second locking ring segment 36 defining a circumferential arc 28 that is smaller than the arc of the notch 20; and sliding the second locking ring segment 36 into the groove 9 so that most of the second locking ring 36 segment is no longer in the notch 20; in which the first 8 and second 36 locking ring segments each comprise a tab 22 extending axially distally in regard to the female joint member 3. In a further specific embodiment, the method comprises inserting the second locking ring segment 36 into the notch 20, the second locking ring segment 36 having a shape complementary to the shape of the groove 9, and the second locking ring segment 36 defining a circumferential arc 28 that is smaller than the arc of the notch 20; sliding the second locking ring segment 36 into the groove 9 so that most of the second locking ring segment 36 is no longer in the notch 20; inserting a third locking ring segment 37 into the notch 20, the third locking ring segment 37 having a shape complementary to the shape of the groove 9, and the third locking ring segment 37 defining a circumferential arc 28 that is smaller than the arc of the notch 20; sliding the third locking ring segment 37 into the groove 9 so that most of the third locking ring segment 37 is no longer in the notch 20; in which the first 8 and second 36 locking ring segments each comprise a tab 22 extending axially distally in regard to the female joint member 3.

In embodiments of the joint 1 comprising a restraint 15, the method may comprise: fastening the restraint 15 onto the female joint member 3, in which the restraint 15 will fail when exposed to stress exceeding a stress threshold; and fastening the restraint 15 onto the male joint member 2 in a position such that the raised stop 4 remains positioned between the locking ring segment 8 and the constriction 5. The restraint 15 may be fastened to the male 2 and female 3 joint members by any means known in the art. For example the restraint 15 may be bolted onto one or both members, or welded onto one or both of the members. The fastening means may be the mechanism by which failure at the stress threshold is achieved, but this may be achieved by others means; a person of ordinary skill in the art could vary the means by which such controlled failure will occur without undue experimentation. In embodiments of the joint in which the restraint comprises a clamp ring 18 and a bolt 16, the method comprises bolting the restraint 15 onto the female joint member 3; and fastening the clamp ring 18 onto the male joint member 3 in a position such that the raised stop 4 remains positioned between the locking ring segment 8 and the constriction 5. In some such specific embodiments, the bolt 16 is designed to fail above the stress threshold.

In some embodiments of the method the male joint member 3 is inserted so that the raised stop 4 is a given distance from the groove 9 and a given distance from the constriction 5. In one such embodiment the ratio of the distance from the groove 9 to the raised stop 4 and the distance from the groove 9 to the constriction 5 is selected from: 50%, 60%, 70%, 75%, 80%, 85%, 90%, 95%, 99%, 100%, a range between any two of the foregoing values, or at least any of the foregoing values. In a more specific embodiment of the method, the male joint member 2 is inserted such that the ratio of the distance from the groove 9 to the raised stop 4 and the distance from the groove 9 to the constriction 5 is about 82%. In another specific embodiment, the male joint member 2 is inserted such that the ratio of the distance from the groove 9 to the raised stop 4 and the distance from the groove 9 to the constriction 5 is about 100%.

The male joint member 2 can be any that is disclosed above as being suitable for use in the joint. In a specific embodiment of the method, the male joint member 2 is a pipe spigot 29, and the raised stop 4 is a weld bead 27; such specific embodiments may comprise applying a weld bead 27 on the outer surface 12 of the male joint member 2 circumferentially prior to inserting the male joint member 2 into the female joint member 3. Of course, the raised stop 4 may be fastened to the male joint member 2 by any other suitable means prior to insertion.

As explained above, some embodiments of the female joint member 3 are attached to a second pipe 31 (in which case the female joint member 3 can be considered a pipe bell 30). In such cases the method may comprise welding the pipe bell 30 onto the second pipe 31 prior to inserting the male joint member 2 into the female joint member 3. Alternatively, it may comprise casting the pipe bell 30 integrally with a second pipe 31 prior to inserting the male joint member 2 into the female joint member 3.

The method may comprise inserting a gasket 7 between the constriction 5 and the reverse taper region 10. In some embodiments of the method the gasket 7 is inserted into a gasket groove 42 in the female joint member 3.

The method may comprise surrounding the joint 1 with a low-friction polymer layer. The polymer may be any suitable low-friction polymer in any form discussed above. The layer may take the form of a bag that is placed around the joint 1 during or before installation. The method may comprise surrounding the joint 1 before installation, or after installation. One embodiment of the method comprises wrapping the joint 1 in a polymer sheet; another embodiment comprises putting a polymer bag around the joint 1; yet another embodiment comprises applying the polymer layer as a coating on the joint 1.

D. Failure Resistant System

Figure 9:
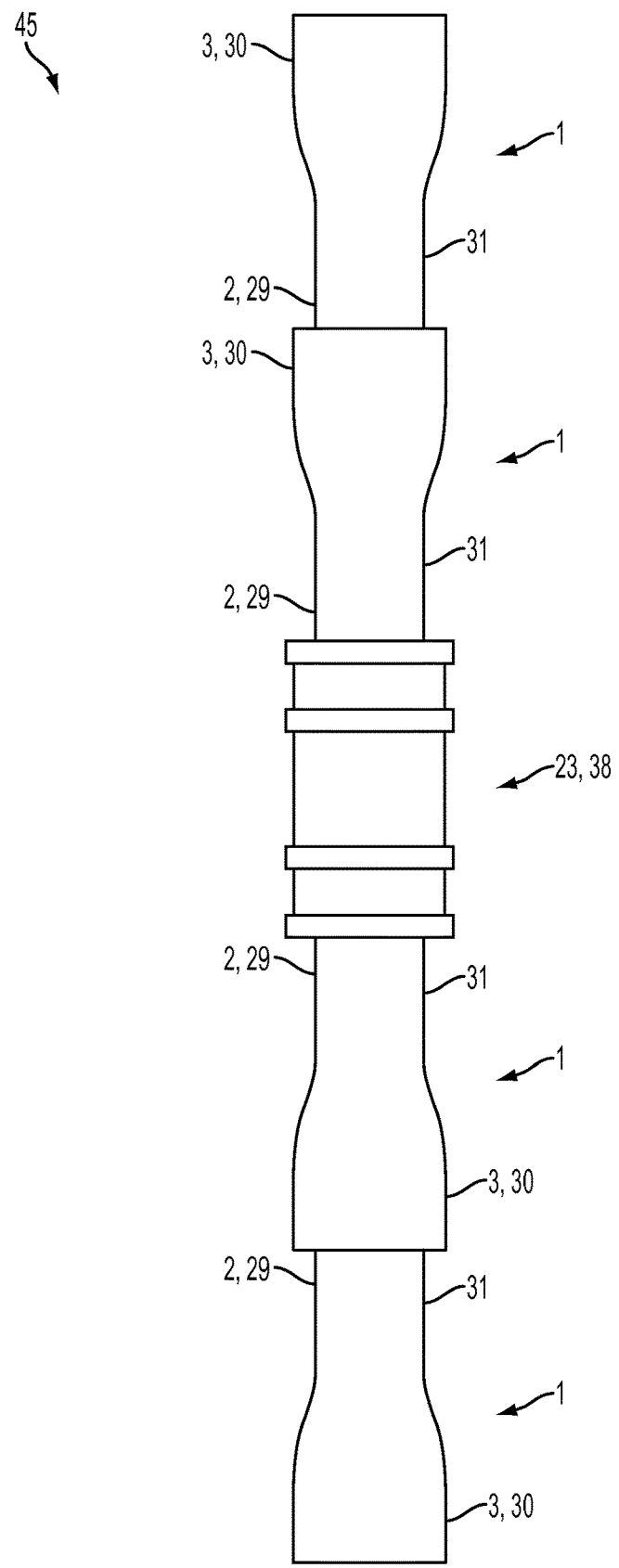
FIG. 9: A plan view of an embodiment of the failure resistant system.
Figure 10:
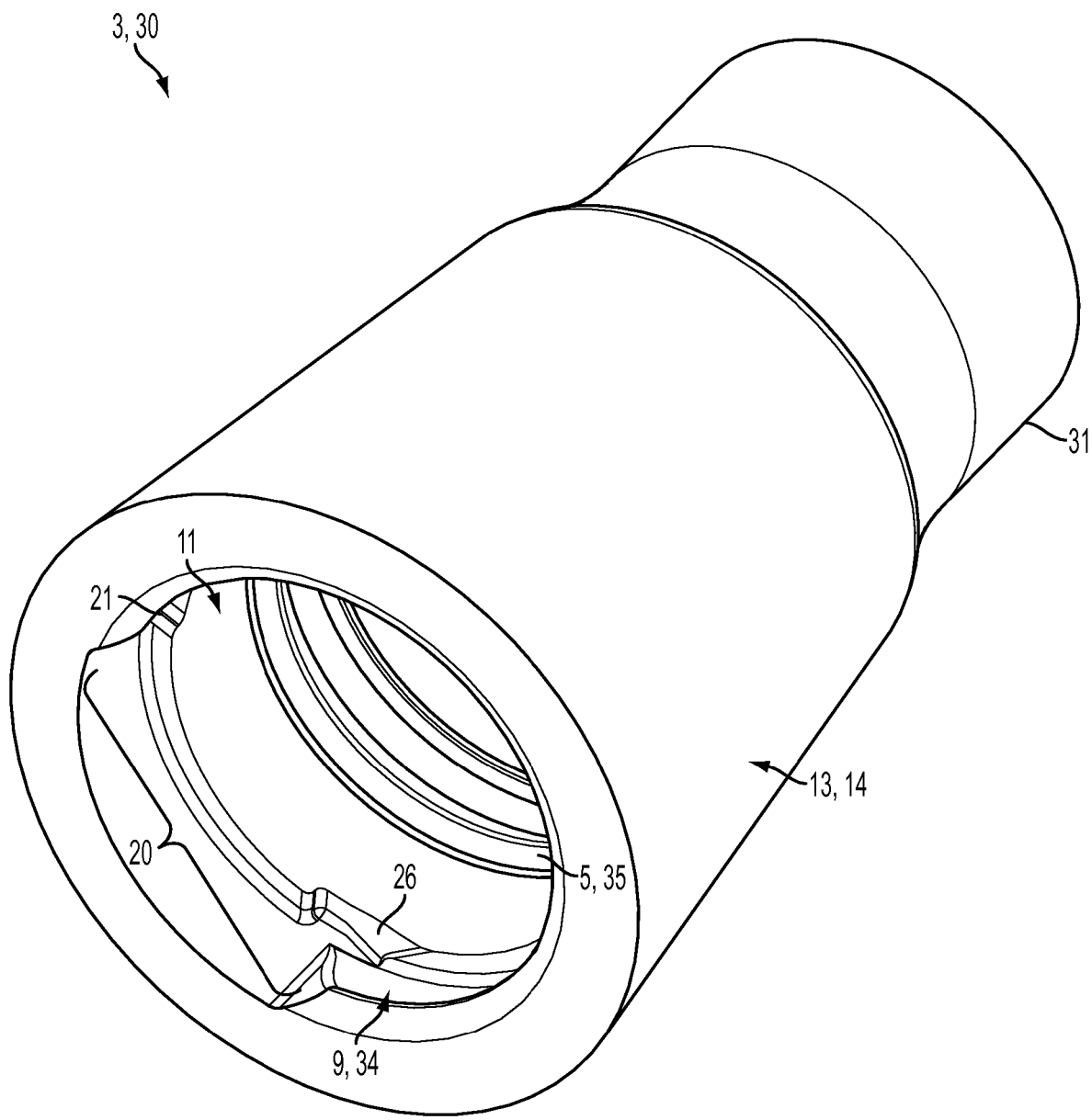
FIG. 10: A perspective view of an embodiment of the joint in which the groove comprises two depressions in the distal surface, each located at one end of the notch.

A failure resistant system 45 for delivering a fluid through pipes is provided (an exemplary embodiment of which is shown in FIG. 9). The system 45 is useful in areas subject to violent displacement of the matrix through which the pipes traverse (such as soil and rock). Such violent displacement can occur as a result of earthquakes, landslides, mudslides, and floods. A general embodiment of the system 45 comprises a plurality of the separation-resistant pipe joints 1 described above. The plurality of pipe joints 1 may be mutually connected, either directly or by way of intervening structures. The system may also include a plurality of restrained pipe joints 38 each comprising a telescoping sleeve 23 accommodating two pipe ends. Such telescoping sleeves 23 are used to provide restrained joints 38, and can buffer the system against compression stresses. Examples of such restrained pipe joints 38 comprising a telescoping sleeve 23 are commercially available from the United States Pipe and Foundry Co., LLC (Birmingham, Ala., USA) under the trade names TR FLEX® and HP LOK®.

In some embodiments of the system 45 at least one of the plurality of pipe joints 1 comprises a second pipe 31 having a second weld bead, and the second pipe 31 is inserted into another of the plurality of pipe joints. This provides a series of highly separation-resistant joints along at least a portion of the system. Typically such second pipes 31 are 18-20' in axial length (549-610 cm). Accordingly, certain embodiments of the system 45 comprise one of the plurality of separation-resistant pipe joints 1 placed an average of about every 20' (610 cm), every 18' (549 cm), or an intermediate length along a line of pipe. The system 45 may comprise a low-friction polymer layer surrounding the components of the system. The polymer may be any suitable low-friction polymer, such as polyethylene or polyurethane. The layer may take the form of a bag that is placed around the components of the system during or before installation. It may also take the form a sheet that is wrapped around the components during or before installation. Additional forms of the layer, such as a coating or a barrier, are also contemplated.

E. Conclusions

It is to be understood that any given elements of the disclosed embodiments may be embodied in a single structure, a single step, a single substance, or the like. Similarly, a given element of a disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

The invention claimed is:

1. A separation-resistant pipe joint comprising a female joint member, said female joint member comprising:
   (a) an inner surface;
   (b) a circumferential groove on the inner surface to accommodate a locking ring segment, said circumferential groove having a shape consisting essentially of a frustum of an ellipsoid defined by two generally parallel planes each intersecting the ellipsoid such that the center of the ellipsoid is not between the two generally parallel planes;
   (c) a constriction on the inner surface proximal to the circumferential groove, the constriction having a constriction diameter;
   (d) an unobstructed traverse region between the groove and the constriction having a regional diameter that is greater than the constriction diameter, in which the female joint member is a pipe bell, in which the pipe bell is joined to a second pipe having a second pipe axial length, and in which the axial length of the traverse region is at least about 0.2% of the second pipe axial length; and
   (e) an unobstructed reverse taper region proximal to the constriction, having a second regional diameter that is greater than or equal to the constriction diameter and which increases in the proximal direction.

2. The joint of claim 1, comprising:
   (a) a locking ring segment in the circumferential groove, the locking ring segment having a shape complementary to the shape of the groove; and
   (b) a male joint member inserted into the female joint member, the male joint member comprising an outer surface and a raised stop on the outer surface positioned between the locking ring segment and the constriction, having a stop diameter greater than the constriction diameter and less than the regional diameter.

3. The joint of claim 2, comprising a restraint fastened to the female joint member and the male joint member, the restraint positioned to maintain the relative positions of the male and female joint members such that the raised stop remains positioned between the locking ring segment and the constriction, and in which the restraint will fail when exposed to stress exceeding an axial stress threshold.

4. The joint of claim 3, in which the stress threshold is less than 3 kN/mm times the diameter of the male joint member.

5. The joint of claim 2, in which the ratio of the distance from the groove to the raised stop and the distance from the groove to the constriction is selected from: 50%, 60%, 70%, 75%, 80%, 85%, 90%, 95%, 99%, 100%, a range between any two of the foregoing values, or at least any of the foregoing values.

6. The joint of claim 2, in which the ratio of the distance from the groove to the raised stop and the distance from the groove to the constriction is about 82%.

7. The joint of claim 2, in which the locking ring segment defines a circumferential arc of about 90°.

8. The joint of claim 2 in which the female joint member comprises a notch that widens the mouth of the female joint member over an arc that is at least as large as the arc of the locking ring segment, for insertion of the locking ring segment into the groove.

9. The joint of claim 2, in which the locking ring segment comprises a tab extending axially distally in regard to the female joint member.

10. The joint of claim 2, in which the locking ring segment comprises a tab extending axially distally in regard to the female joint member, in which the arc of the locking ring segment extends beyond the point where the tab meets the arc.

11. The joint of claim 1, in which the two generally parallel planes are a proximal plane and a distal plane, in which said planes are perpendicular to the axis of the female joint member, and in which the groove comprises a distal surface defined by the surface of the ellipsoid and a proximal surface defined by the proximal plane, and in which the distal surface and the proximal surface meet at a corner.

12. The joint of claim 11, in which said corner is selected from the group consisting of: a rounded corner, a sharp corner, and a beveled corner.

13. The joint of claim 1 in which the female joint member comprises a notch that widens the mouth of the female joint member over an arc that is less than 180°.

14. The joint of claim 1, in which the male joint member is a pipe end.

15. The joint of claim 1, in which the male joint member is the spigot end of a pipe.

16. The joint of claim 1, in which the female joint member is a pipe bell, and in which the pipe bell is joined to a second pipe.

17. The joint of claim 1, in which the female joint member comprises a streamlined outer surface that increases in diameter in the distal direction, in which said increase in diameter does not exceed about 10° at any point.

18. The joint of claim 1, in which the female joint member comprises a streamlined outer surface that increases in diameter in the distal direction, in which said increase in diameter is no more than about 6° at any point.

19. The joint of claim 1, in which the female joint member comprises a streamlined outer surface that increases in diameter in the distal direction, in which said increase in diameter does not exceed about 10° between the point at which the pipe bell is joined to the second pipe and the groove.

20. The joint of claim 1, in which the female joint member comprises a streamlined outer surface that increases in diameter in the distal direction, in which said increase in diameter does not exceed about 6° between the point at which the pipe bell is joined to the second pipe and the groove.

21. A method of assembling separation-resistant pipe joint, in which the pipe joint comprises a male pipe joint member and the female pipe joint member of claim 1; the male pipe joint member comprising a raised stop on its outer surface and having a stop diameter; the female pipe joint member comprising a notch that widens the mouth of the female joint member over an arc of less than 180°; the method comprising:
 (a) inserting the male joint member into the female joint member to an extent that the raised stop passes the groove;
 (b) inserting a locking ring segment into the notch, the locking ring segment having a shape complementary to the shape of the groove, and the locking ring segment defining a circumferential arc that is smaller than the arc of the notch; and
 (c) sliding the locking ring segment into the groove so that most of the locking ring segment is no longer in the notch.

22. A failure resistant system for delivering a fluid through a pipe, the system comprising a plurality of the separation-resistant pipe joints of claim 1.

23. The failure resistant system of claim 22, comprising a plurality of restrained pipe joints, said restrained pipe joints each comprising a telescoping sleeve accommodating two pipe ends.

24. The system of claim 22, comprising one of the plurality of separation-resistant pipe joints placed an average of about every 20' (6.1 m) along a line of pipe.

25. The system of claim 22, comprising one of the plurality of separation-resistant pipe joints placed about every 18' (5.5 m) along a line of pipe.

26. The system of claim 22, comprising a low-friction polymer layer surrounding the components of the system.

* * * * *